United States Patent
Schultz

(10) Patent No.: US 7,503,036 B2
(45) Date of Patent: Mar. 10, 2009

(54) TESTING MULTI-BYTE DATA HANDLING USING MULTI-BYTE EQUIVALENTS TO SINGLE-BYTE CHARACTERS IN A TEST STRING

(75) Inventor: Dale M. Schultz, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 881 days.

(21) Appl. No.: 10/784,689

(22) Filed: Feb. 23, 2004

(65) Prior Publication Data

US 2005/0188308 A1    Aug. 25, 2005

(51) Int. Cl.
*G06F 9/44* (2006.01)
(52) U.S. Cl. ...................................... 717/124
(58) Field of Classification Search .............. 717/136, 717/124; 704/8; 714/38
See application file for complete search history.

(56) References Cited

U.S. PATENT DOCUMENTS

| | | | | |
|---|---|---|---|---|
| 6,047,252 A | * | 4/2000 | Kumano et al. | 704/2 |
| 6,425,123 B1 | * | 7/2002 | Rojas et al. | 717/136 |
| 6,453,462 B1 | * | 9/2002 | Meade et al. | 717/124 |
| 6,496,844 B1 | * | 12/2002 | Hetherington et al. | 715/536 |
| 6,507,812 B1 | * | 1/2003 | Meade et al. | 704/8 |
| 2002/0022953 A1 | * | 2/2002 | Bertolus et al. | 704/1 |
| 2003/0182103 A1 | * | 9/2003 | Atkin | 704/9 |
| 2005/0050526 A1 | * | 3/2005 | Dahne-Steuber et al. | 717/136 |
| 2005/0065772 A1 | * | 3/2005 | Atkin et al. | 704/2 |

* cited by examiner

*Primary Examiner*—Lewis A. Bullock, Jr.
*Assistant Examiner*—Jue S Wang
(74) *Attorney, Agent, or Firm*—Chris Cianciolo, Esq.; Steven M. Greenberg, Esq.; Carey Rodriguez Greenberg & Paul LLP

(57) ABSTRACT

A method and system for generating multi-byte equivalents based upon single byte source test data for use in testing a computer program. A method for testing multi-byte data handling can include the steps of converting each single byte native text character of a source string to a multi-byte equivalent to produce a multi-byte test string. Subsequently, the multi-byte test string can be provided to a testing tool for use when testing a computer program. Notably, the multi-byte equivalent can be a wide Latin equivalent.

12 Claims, 2 Drawing Sheets

TESTING MULTI-BYTE DATA HANDLING USING MULTI-BYTE EQUIVALENTS TO SINGLE-BYTE CHARACTERS IN A TEST STRING

BACKGROUND OF THE INVENTION

1. Statement of the Technical Field

The present invention relates to the internationalization of computer software, and more particularly, to testing multi-byte character handling in an application under test.

2. Description of the Related Art

Internationalizing computer software can be difficult and expensive. Yet, the internationalization of computer software can be critical to ensure the global success of computer software. In this regard, it has been estimated that worldwide business-to-business e-commerce will have grown to $30 billion by the early 21st century, while at the same time non-English speakers will constitute more than 50 percent of the world's online population. With more than half of the world's Internet users predicted to be non-native English speakers in the near future, going global is not merely a business advantage in the 21st century; it is a business imperative.

In the past, the process of accommodating a specific country's language, conventions, and culture was done on a more or less ad hoc basis—essentially retrofitting software to accommodate a particular locale. Merely separating the text in a user interface from one's program is not an acceptable solution, however. Even after translating software prompts, help messages, and other textual information to the target languages, one still has to address basic issues of displaying and printing characters in the target language.

Information interchange codes define character sets for national languages. The necessary symbols or characters are relatively few in number in most languages. English, for example, uses only 26 Roman letters, each of which has an upper case and a lower case representation, for 52 symbols. German requires the addition of only 7 symbols, allowing for three vowels receiving diacritics (both in upper case and lower case) and the Greek lower case beta symbol. In all it has been found sufficient to provide 256 bytes of 8 bits each to express all of these characters.

Unlike most languages, Chinese, Japanese, and Korean contain more than 256 characters. Traditional written Chinese utilizes in excess of 13,000 ideographs. Japanese utilizes between 3,000 and 8,000 ideographs (kanji characters) and several hundred other symbols for the numerical, hiragana and katakana characters. Conversion between interchange codes is further complicated by the fact that the ideograph sets for Japanese, Korean, Traditional Chinese and Simplified Chinese differ in content and size. To handle such large character bases, the interchange code sets for these languages use a double-byte of 16 bits for each character. This allows the expression of some 65,536 characters.

As more companies deploy software products world-wide, software testing must change to verify software products developed for deployment in non-English operating environments. To that end, the Global Verification Test (GVT) addresses the testing of software for international compatibility. GVT is a portion of the product functional verification test that addresses internationalization issues. GVT assures that software can run in non-US environments and after translation. The goal of GVT is to certify that a product is ready for world-wide distribution.

Some of the techniques utilized in GVT include verification through execution, pseudo translation environments and scanning. Verification through execution involves running the un-translated application to verify specific functional support such as bi-directional language support, Unicode character set support or multi-byte character set support for platforms that do not yet support Unicode. Third Party source scanning tools search source code for potential internationalization problems. Finally, pseudo translation tools incorporate several pseudo-languages and pseudo locales which disclose problems undetectable by code scanning tools such as data formatting, field expansion, column misalignment, and line truncation.

Notably, GVT ensures that text data having multi-byte characters can be input, handled and displayed without corruption. One of the most important international markets is the Far East in which many countries use text that requires multi-byte characters such as Japanese and Chinese. The testing of the ability of software to handle multi-byte character data currently requires that the testing personnel be able to read the language. This often can lead to expensive assignments as the normal functional tester is English speaking and cannot read foreign text. Pseudo translation tools have been developed that either use the full width ASCII equivalents of a multi-byte character, or that simply repeat a single Asian character and retain the English text as it was. These solutions only address the text that appears as part of a user interface and these solutions do not test the ability of the software under test to handle user data correctly.

SUMMARY OF THE INVENTION

The present invention addresses the deficiencies of the art in respect to testing multi-byte data handling in an application under test and provides a novel and non-obvious method, system and apparatus for generating multi-byte equivalents based upon test data for use in testing a computer program. A method for testing multi-byte data handling can include the steps of converting each single byte native text character of a source string to a multi-byte equivalent to produce a multi-byte test string. Subsequently, the multi-byte test string can be provided to a testing tool for use when testing a computer program. Notably, the multi-byte equivalent can be a wide Latin equivalent. A Latin equivalent, by way of example, can include the Unicode characters ranging from U+FF21 through U+FF5A.

The converting step can include determining, for each single byte native text character, whether the character falls within a range of alphanumeric characters. Subsequently, for each single byte native character, the character can be converted to a multi-byte equivalent to produce a multi-byte test string only if the character falls within the range. Preferably, the converting step can include the step of adding a fixed integer value to each character to produce a wide Latin equivalent.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for testing multi-byte data handling in an application under test. In accordance with the present invention, a source string of test data can be converted to a multi-byte string by converting each character in the string to its multi-byte equivalent. Once converted, the multi-byte equivalent version of the source string can be provided as input to an application under test to ensure that not only whether the user interface of the application test can properly render the multi-byte equivalent version of the source string, but also whether the internal logic of the application under test can process, store and retrieve the multi-byte representation of the source string.

Figure 1:
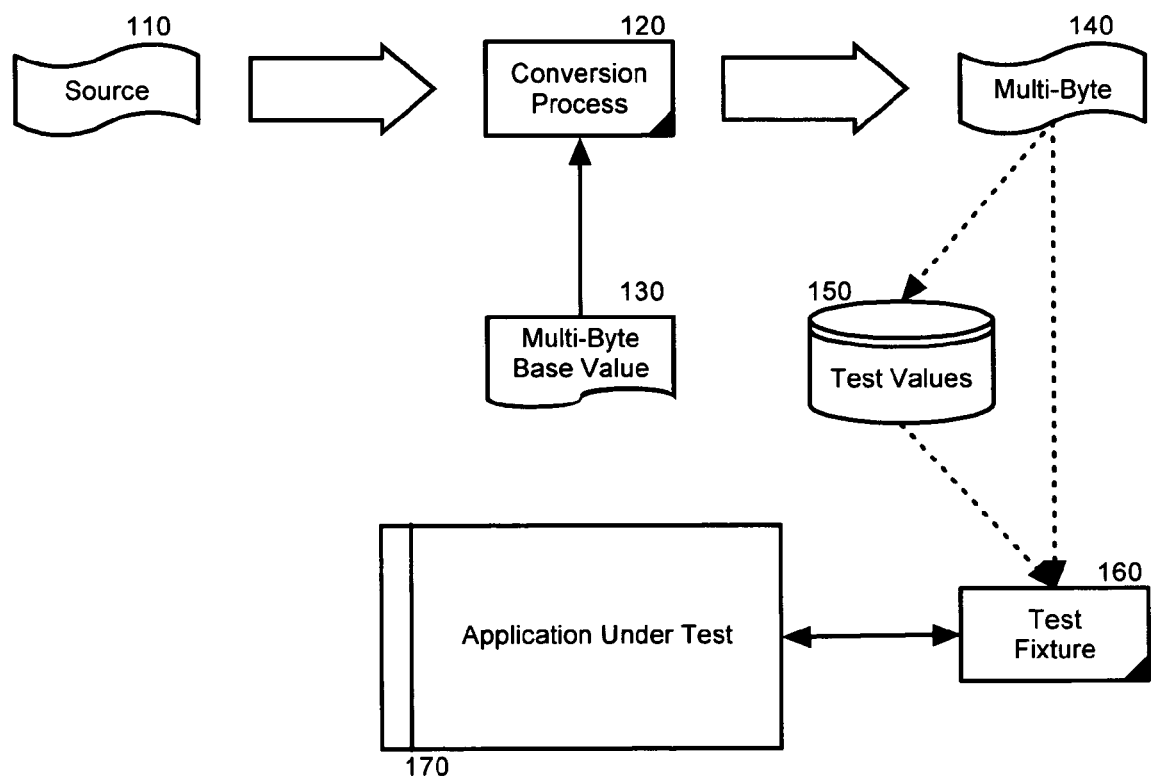
FIG. 1 is a schematic illustration of a system for testing multi-byte data handling in an application under test; and, FIG. 2 is a flow chart illustrating a process for testing multi-byte data handling converting Latin characters to multi-byte equivalents in the system of FIG. 1.

In a more particular illustration of a preferred embodiment of the present invention, FIG. 1 is a schematic illustration of a system for testing multi-byte data handling in an application under test. The system can include a conversion processor 120 configured to process source strings 110 into multi-byte equivalents 140. The multi-byte equivalents 140 can be based upon a base coding value 130 specific to the particular coding scheme. Preferably, the multi-byte equivalents 140 can be full width Latin equivalents such as those provided by Unicode. The multi-byte equivalents 140 produced by the conversion processor 120 can be provided to a testing tool 160 as input to an application under test 170. Alternatively, the multi-byte equivalents can be stored in a table of test values 150 which the testing tool 160 can use for automating the testing process.

Figure 2:
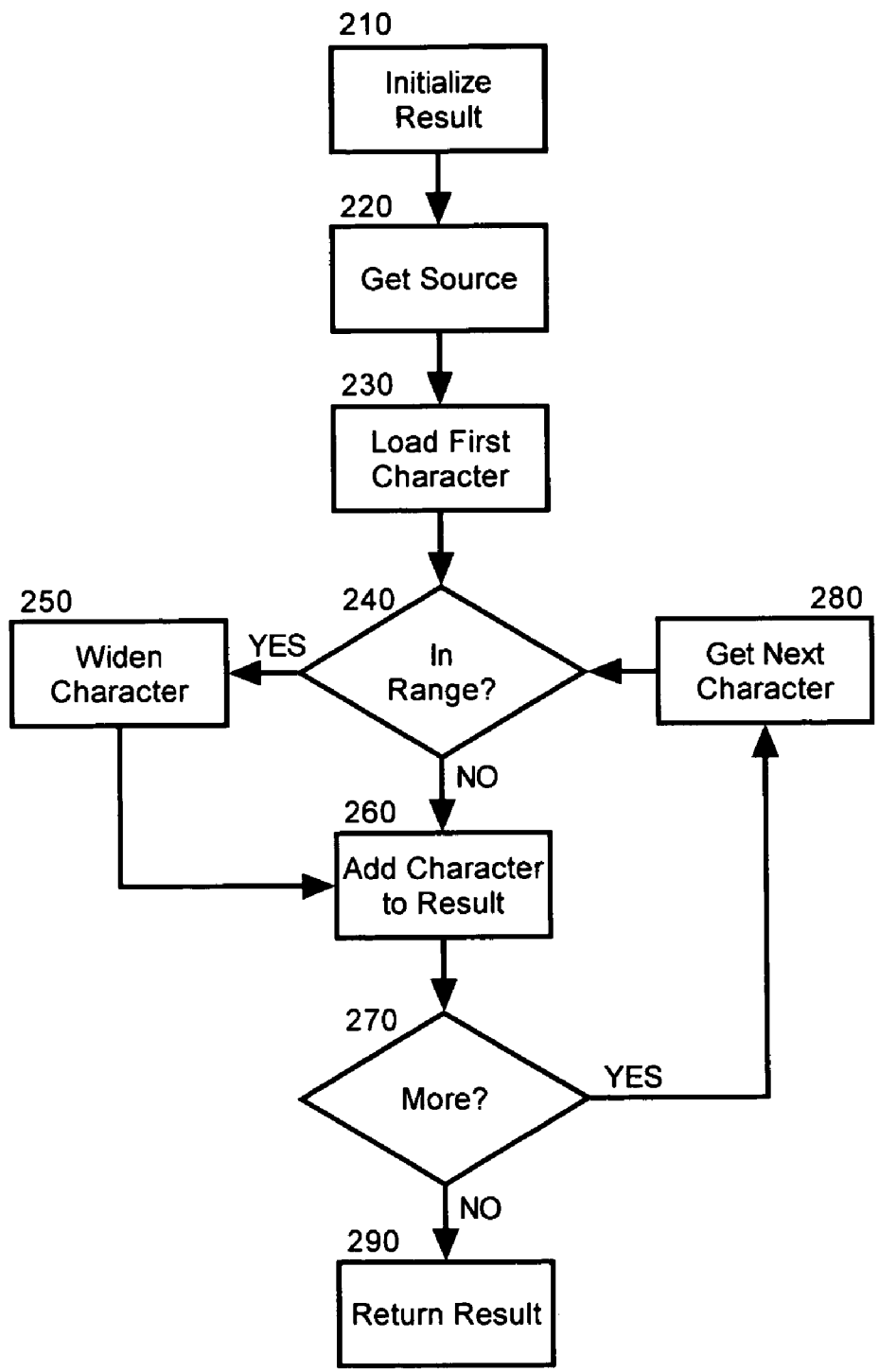

FIG. 2 is a flow chart illustrating a process for testing multi-byte data handling in the system of FIG. 1. Beginning in block 210, a result string can be initialized and in block 220, a source string can be loaded for processing. In block 230, a first character in the source string can be loaded. If in decision block 240, the character is within a code range indicating that the character is alphanumeric in nature, whether upper or lower case, then the character can be widened from a single byte value to the multi-byte value in block 250. For example, a base code value can be added to the code value of the character to change the character type from a single byte native text value to its full width Latin equivalent. In the case of Unicode, for instance, the native text string "ABC" can convert to full width Latin by adding the integer value 65,248 to each of the letters "A", "B" and "C".

In either case, in block 260, the character can be added to the result string. In decision block 270, if additional characters in the source string remain to be processed, in block 280 the next character in the source string can be loaded for processing. Subsequently, the process of blocks 240 through 270 can repeat until no characters in the source string remain to be processed. Once all of the characters in the source string have been processed, in block 290 the result can be returned. In this regard, in a preferred aspect of the present invention, the result can include a string comprising full width Latin equivalents to the single byte narrow native text of the source string.

The present invention can be realized in hardware, software, or a combination of hardware and software. For example, the data handling policy can be stored in a database. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein. For example, the data handling policy can be stored in a database.

A typical combination of hardware and software could be a general purpose computer system having a central processing unit and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computer system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A method for testing multi-byte data handling comprising the steps of:

converting each single byte native text character of a source string to a multi-byte equivalent comprising a wide Latin equivalent to produce a multi-byte test string, said converting comprising, for each said single byte native text character, determining whether said character falls within a range of alphanumeric characters, and for each said single byte native character, converting said character to a multi-byte equivalent to produce a multi-byte test string only if said character falls within said range; and, providing said multi-byte test string to a testing tool for use when testing a computer program.

2. The method of claim 1, wherein said wide Latin equivalent comprises Unicode characters ranging from U+FF21 through U+FF5A.

3. The method of claim 1, wherein said converting step comprises the step of adding a fixed integer value to each said character to produce said wide Latin equivalent.

4. A machine readable storage having stored thereon a computer program for testing multi-byte data handling, the computer program comprising a routine set of instructions which when executed by a machine cause the machine to perform the steps of:

converting each single byte native text character of a source string to a multi-byte equivalent comprising a wide Latin equivalent to produce a multi-byte test string, said converting comprising, for each said single byte native text character, determining whether said character falls within a range of alphanumeric characters, and for each said single byte native character, converting said character to a multi-byte equivalent to produce a multi-byte test string only if said character falls within said range; and, providing said multi-byte test string to a testing tool for use when testing a computer program.

5. The machine readable storage of claim 4, wherein said wide Latin equivalent comprises Unicode characters ranging from U+FF21 through U+FF5A.

6. The machine readable storage of claim 4, wherein said converting step comprises the step of adding a fixed integer value to each said character to produce said wide Latin equivalent.

7. A method for testing multi-byte data handling comprising the steps of:
 first loading a first single-byte character in a test string;
 adding a base value to said loaded character to convert said character to a multi-byte equivalent character comprising a wide Latin equivalent;
 inserting said multi-byte equivalent character into a result string at a position in said result string equivalent to a corresponding position in said test string;
 second loading a next single byte character in said test string; and,
 repeating said adding, inserting and second loading steps for each remaining character in said test string.

8. The method of claim 7, wherein said adding step comprises the step of adding a base value to said loaded character to convert said character to a wide Latin equivalent comprising Unicode characters ranging from U+FF21 through U+FF5A.

9. The method of claim 7, further comprising the step of performing said adding step only if said loaded character is an alphanumeric character.

10. A machine readable storage having stored thereon a computer program for testing multi-byte data handling, the computer program comprising a routine set of instructions which when executed by a machine cause the machine to perform the steps of:
 first loading a first single-byte character in a test string;
 adding a base value to said loaded character to convert said character to a multi-byte equivalent character comprising a wide Latin equivalent;
 inserting said multi-byte equivalent character into a result string at a position in said result string equivalent to a corresponding position in said test string;
 second loading a next single byte character in said test string; and,
 repeating said adding, inserting and second loading steps for each remaining character in said test string.

11. The machine readable storage of claim 10, wherein said adding step comprises the step of adding a base value to said loaded character to convert said character to a wide Latin equivalent comprising Unicode characters ranging from U+FF21 through U+FF5A.

12. The machine readable storage of claim 10, further comprising the step of performing said adding step only if said loaded character is an alphanumeric character.

\* \* \* \* \*